(12) United States Patent
Sandberg et al.

(10) Patent No.: US 9,565,673 B2
(45) Date of Patent: Feb. 7, 2017

(54) METHOD AND ARRANGEMENT FOR CONTROLLING TRANSMISSION OF DELAY SENSITIVE DATA IN A PACKET DATA COMMUNICATION NETWORK

(75) Inventors: David Sandberg, Solna (SE); Alexander Langereis, Sigtuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 14/372,149

(22) PCT Filed: Jan. 23, 2012

(86) PCT No.: PCT/SE2012/050051
§ 371 (c)(1),
(2), (4) Date: Jul. 14, 2014

(87) PCT Pub. No.: WO2013/112078
PCT Pub. Date: Aug. 1, 2013

(65) Prior Publication Data
US 2014/0341194 A1    Nov. 20, 2014

(51) Int. Cl.
*H04W 72/04* (2009.01)
*H04L 1/00* (2006.01)
(Continued)

(52) U.S. Cl.
CPC ........ *H04W 72/0446* (2013.01); *H04L 1/0025* (2013.01); *H04L 1/0027* (2013.01); *H04W 72/085* (2013.01); *H04L 1/08* (2013.01)

(58) Field of Classification Search
None
See application file for complete search history.

(56) References Cited

U.S. PATENT DOCUMENTS

2007/0183323 A1    8/2007  Hannu et al.
2010/0042888 A1*   2/2010  Kuo ..................... H04W 52/48
                                                   714/749
(Continued)

FOREIGN PATENT DOCUMENTS

CN    101594650 A    12/2009
CN    101651601 A     2/2010
(Continued)

OTHER PUBLICATIONS

Notification of Transmittal of the International Search Report and the Written Opinion of the International Searching Authority, Oct. 26, 2012, 11 pages.
(Continued)

*Primary Examiner* — Wei Zhao
*Assistant Examiner* — Ronald H Davis
(74) *Attorney, Agent, or Firm* — NDWE LLP

(57) ABSTRACT

This disclosure deals with an apparatus in a base station for controlling transmission of delay-sensitive data from a transmitter over a transmission link in a packet data communication network, which transmitter is capable of changing between a TTI bundling enabled mode and a TTI bundling disabled mode. The apparatus comprises: a receiver for receiving data from the transmitter over the transmission link; a decision unit for deciding that the transmitter should change TTI bundling mode; a silent mode detection unit for detecting that the transmitter is in the silent mode; and a triggering unit for triggering change of TTI bundling mode in response to deciding that the transmitter should change TTI bundling mode and in response to detecting that the transmitter is in the silent mode. The disclosure further relates to a corresponding method.

20 Claims, 5 Drawing Sheets

(51) Int. Cl.
*H04W 72/08* (2009.01)
*H04L 1/08* (2006.01)

(56) References Cited

U.S. PATENT DOCUMENTS

| | | | | |
|---|---|---|---|---|
| 2011/0117948 A1* | 5/2011 | Ishii | ...................... | H04L 5/0007 455/509 |
| 2011/0141991 A1* | 6/2011 | Gao | ...................... | H04L 1/1887 370/329 |
| 2011/0200020 A1* | 8/2011 | Xu | ........................ | H04L 1/1657 370/336 |

FOREIGN PATENT DOCUMENTS

| | | |
|---|---|---|
| EP | 1126651 | 8/2001 |
| WO | WO-2011025427 | 3/2011 |

OTHER PUBLICATIONS

International Preliminary Report on Patentability, Application No. PCT/SE2012/050051, dated Aug. 7, 2014, 8 pages.
First Office Action from CN Application No. 201280067874.8 mailed Oct. 18, 2016, 8 pages.

\* cited by examiner

METHOD AND ARRANGEMENT FOR CONTROLLING TRANSMISSION OF DELAY SENSITIVE DATA IN A PACKET DATA COMMUNICATION NETWORK

CROSS-REFERENCE TO RELATED APPLICATIONS

This application is a National stage of International Application No. PCT/SE2012/050051, filed Jan. 23, 2012, which is hereby incorporated by reference.

TECHNICAL FIELD

The present disclosure relates generally to a method and an arrangement for controlling transmission of delay sensitive data from a transmitter over a transmission link in a packet data communication network.

BACKGROUND

Cellular communication networks evolve towards higher data rates, together with improved capacity and coverage. In the 3$^{rd}$ Generation Partnership Project (3GPP) standardization body, technologies like Global System for Mobile Communication (GSM), General Packet Radio Service (GPRS), Wideband Code Division Multiple Access (WCDMA), High Speed Packet Access (HSPA) and Long Term Evolution (LTE) have been and are currently being developed.

LTE is the latest technology standardized. LTE uses an access technology based on Orthogonal Frequency Divisional Multiplexing (OFDM) for downlink communication (DL), i.e. communication from a base station, called eNodeB in LTE, to a user equipment (UE), and Single Carrier FDMA (SC-FDMA) for uplink communication (UL), i.e. communication from a UE to an eNodeB. The resource allocation to UEs on both DL and UL is performed adaptively by a scheduling mechanism called fast scheduling that takes into account current traffic patterns and radio propagation characteristics for each UE. Assigning resources in both DL and UL is performed in a scheduler situated in the eNodeB.

In LTE, data packets in all services are delivered using the IP protocol. This means that also delay-sensitive data such as voice conversation, which traditionally has been a circuit switched service, is sent over IP. The voice conversation service may then be called Voice over IP (VoIP).

For VoIP being a real-time service, there is not much time for queuing of data packets and for retransmissions. Especially for users experiencing bad channel conditions, such as users at a cell edge, a data frame arriving at a receiver may have such a high frame error rate that it needs to be retransmitted for the receiver to understand the data. When many data packets have to be retransmitted, there will be an increased data packet delay resulting in bad voice quality. Also, frequent retransmissions for one user equipment take up system resources and will thereby reduce the total system performance. Consequently, the retransmissions to/from a user equipment experiencing bad channel quality will lead to increased packet delay to the user equipment and will also require much system resources which will lead to reduced voice quality for other user equipments in the cell.

A way to solve such a problem may be to split a VoIP packet into a number of segments, which are transmitted over the air interface individually. Since each segment is smaller than the VoIP packet, each segment can be transmitted with a larger success probability than the VoIP packet. But since every segment needs its own control information in a header, such as a Radio Link Control and a Medium Access Control header, the transmission of many small segments will result in increased overhead, and thereby decreased system capacity. Also, load on control channels will increase since smaller scheduling units mean that more scheduling needs to be performed and every segment requires a new control message, e.g. a Physical Downlink Control Channel message.

To alleviate this problem a mechanism called Transmission Time Interval (TTI) bundling has been standardized in the 3GPP for UMTS, LTE etc. A TTI is generally a duration of time for a transmission over an air interface. Especially, TTI relates to encapsulation of higher layer data into frames and further into packets for transmission on the radio link layer.

When TTI bundling is used for a UE, the same VoIP packet is transmitted in four consecutive TTIs. The receiver can then combine the four received TTIs using a Hybrid Automatic Repeat Request (HARQ) mechanism and get effectively four times the received energy for the same VoIP packet. With this increase in received energy, the VoIP packet can be received with better quality and without extensive retransmission or segmentation, thus leading to decreased packet delay.

But since the same VoIP frame is transmitted four times in a row, lots of transmission resources are used for the transmission, i.e. resources that may otherwise have been used for other UEs in the cell. Also, when TTI bundling is used, only a limited number of physical resource blocks, and the most robust Modulation and Coding Schemes can be used. Hence the transport block size and thereby also the throughput that can be achieved for a user using TTI bundling is very limited.

Consequently, the use of TTI bundling in a cell should be limited, e.g. to user equipments in need of TTI bundling and/or to a maximum amount of user equipments in the cell. This implies that it is necessary to perform switching of user equipments from a TTI bundling enabled mode to a TTI bundling disabled mode, and vice versa.

To perform a switch between TTI bundling enabled mode and TTI bundling disabled mode in LTE today is initiated through an RRC Connection Reconfiguration Request message sent from the eNodeB to the UE. The duration of the whole procedure from initiation to completion of the switch varies but can be as high as 50-100 ms. During this time period no data packets can be transmitted to or from the UE. This means that an extra delay of up to 50-100 ms will be added to the already existing data frame delay caused by e.g. bad reception quality. Thus, the total delay may become so large that the quality of the received speech will be reduced, and speech frames received too late may need to be discarded.

SUMMARY

It is an object of the invention to address at least some of the problems and issues outlined above. One object is to efficiently control transmission of delay-sensitive data from a transmitter over an air interface link in a packet data network. It is possible to achieve these objects and others by using a method and an apparatus as defined in the attached independent claims.

According to one aspect, a method is provided for controlling transmission of delay-sensitive data from a transmitter over a transmission link in a packet data communication network, which transmitter is capable of changing between a TTI bundling enabled mode and a TTI bundling disabled mode. The method comprises: receiving data from the transmitter over the transmission link; deciding that the transmitter should change TTI bundling mode; detecting that the transmitter is in a silent mode, and triggering change of TTI bundling mode in response to deciding that the transmitter should change TTI bundling mode and in response to detecting that the transmitter is in a silent mode.

An advantage of this method is that the delay experienced for delay-sensitive data, such as VoIP, and caused by the switch between TTI bundling modes may be minimized by triggering a switch between modes in a situation when the transmitter is in a silent mode. The time during which the UE cannot be scheduled due to the switching process may not affect or at least only to a small degree affect speech frame delay, when the switch is performed during silent mode. This may increase the quality of the delay-sensitive data and the capacity of the cell. Also, the time between data packets is normally larger when the transmitter is in silent mode compared to when the transmitter is speech mode. Therefore, there may be fewer packets in the transmitter buffer when scheduling resumes, if a TTI bundling mode switch is performed in silent mode compared to if a switch is performed in active mode.

A Transmission Time Interval is a duration of time for a transmission over an air interface link. By TTI bundling is meant that the same data is sent in a number of TTIs, preferably a number of consecutive TTIs. By TTI bundling enabled mode is meant that the transmitter is in a mode where it is set to use TTI bundling for sending data over the air interface link. By TTI bundling disabled mode is meant that the transmitter is in a mode where it is set not to use TTI bundling for sending data over the air interface link. By the transmitter being in silent mode is meant that a service at the transmitter generating delay-sensitive data is inactive, for example that a VoIP service is inactive. This may be detected by analyzing the data packets that are to be sent by the transmitter or that have been transmitted. The data packets may be analyzed to detect Silent Insertion Descriptors (SIDs) sent over the air interface. By delay-sensitive data is meant real-time data such as voice, e.g. voice over IP, video etc.

According to another aspect, an arrangement is provided for controlling transmission of delay-sensitive data from a transmitter over a transmission link in a packet data communication network, which transmitter is capable of changing between a TTI bundling enabled mode and a TTI bundling disabled mode. The arrangement comprises: a receiver for receiving data from the transmitter over the transmission link; a decision unit for deciding that the transmitter should change TTI bundling mode; a silent mode detection unit for detecting that the transmitter is in a silent mode; and a triggering unit for triggering change of TTI bundling mode in response to deciding that the transmitter should change TTI bundling mode and in response to detecting that the transmitter is in a silent mode.

The above method and apparatus may be configured and implemented according to different optional embodiments. In one possible embodiment, to decide that the transmitter should change TTI bundling mode is performed in response to detecting that the transmission link has changed quality. By such a method the number of UEs of a cell being in TTI enabled mode may be limited to the UEs actually in need of it. Consequently, the right UEs may be configured to operate in TTI bundling enabled mode, when at the same time air interface resources used for TTI bundling may not be wasted.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, this disclosure is engaged with the need to control whether a transmitter 110 transmitting delay sensitive data, especially a transmitter in a UE, is in TTI bundling enabled mode or TTI bundling disabled mode. If a transmitter is in TTI bundling enabled mode, more radio resources is used, but there is a greater possibility that the data sent by the transmitter is received correctly at the receiver. Consequently, TTI bundling enabled mode is useable for UEs experiencing weaker radio connections. To use the radio resources in a more optimal way, it is necessary to limit the amount of users being in TTI bundling enabled mode. This implies that it is necessary to switch UEs from TTI enabled mode to TTI disabled mode and vice versa.

According to the invention, a method for controlling transmission of delay sensitive data is provided, which decides that the transmitter should change TTI bundling mode, but which awaits that the transmitter is in silent mode before a switch between TTI bundling modes is triggered. Since the switch between TTI bundling modes is performed when the transmitter is in silent mode, the switch process will have little or no effect on the quality of the delay-sensitive data. The decision that the transmitter should change TTI bundling mode may be made based on a detection of a quality change of the transmission link over which data is sent. The transmission link is preferably an air interface link. The method is advantageously performed in the base station, i.e. in the eNodeB for an LTE system.

Figure 1:
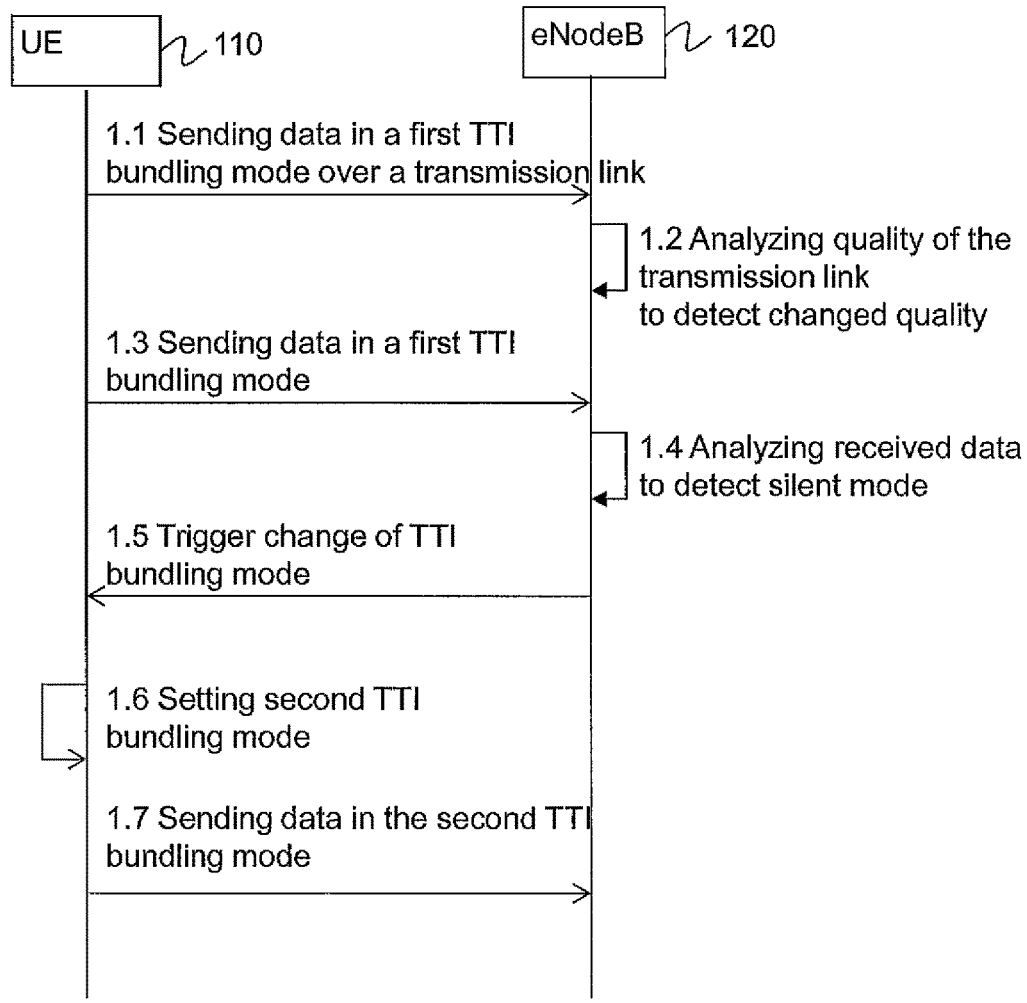
FIG. 1 is a communication scenario illustrating communication between a user equipment and an eNodeB, according to a possible embodiment.

FIG. 1 describes an exemplary communication scenario between a UE 110 and an eNodeB 120 according to a possible embodiment. In 1.1 the user equipment 110 sends data in a first TTI bundling mode, i.e. either TTI bundling enabled mode or TTI bundling disabled mode, over a transmission link to the eNodeB. In the below scenario, it is assumed that the first TTI bundling mode is TTI bundling disabled mode. Quality of the transmission link over which the data is sent is then analyzed 1.2 by the eNodeB to detect changed link quality. The analysis may be performed by analyzing signal to noise ratio (SNR) over time for signals transmitted over the link. When the SNR decreases e.g. below a certain threshold value for which it is decided, e.g. predetermined, that it would be advantageous to use TTI bundling for the transmission over the link, it is decided to switch a transmitter of the UE to TTI bundling enabled mode. Although, the switch is not performed until the transmitter is in silent mode. Consequently, the UE 110 keeps on sending 1.3 delay-sensitive data in TTI bundling disabled mode. In the meantime, the received delay-sensitive data is analyzed 1.4 by the eNodeB 120 to detect if the transmitter is in silent mode. Not until it is detected that the transmitter is in silent mode, the eNodeB sends a command 1.5 to the UE triggering change of TTI bundling mode. On receiving the command from the eNodeB, the UE sets 1.6 its transmitter to the second TTI bundling mode, i.e. in this case TTI bundling enabled mode. Thereafter, the transmitter starts sending 1.7 data in the TTI bundling enabled mode.

In this way, the quality of the link, achieved e.g. by measuring SNR, is used to control the time to switch TTI bundling mode on a large time scale and the estimated service activity (silent mode or speech mode) controls the time to switch TTI bundling mode in a small scale. Consequently, when detecting that the transmission link has changed quality to such a degree that a change of TTI bundling mode is to be performed, and when detecting that the transmitter is in a silent mode, the base station will trigger a change of TTI bundling mode.

According to other embodiments, other link quality measurements than SNR may be used, such as path loss . . .

In a typical delay-sensitive packet data transmission such as VoIP, speech packets and packets identifying silence are alternately transmitted, depending on if the user of the user equipment in which the transmitter is located is speaking or not. These packets may be used to detect if the transmitter is in silent mode or not.

In a typical VoIP arrangement, a voice encoder at the transmitter identifies when the user of the UE speaks and when the user is silent. For this reason, voice activity detection is used. The voice encoder at the transmitter then encodes speech into packets to be transmitted. During silent periods, the voice encoder generates Silence Insertion Descriptor (SID) frames. When the transmitter sends SIDs, the transmitter is said to be in silent mode. The receiver receiving the transmitted SIDs uses the SIDs to generate comfort noise. SID frames have a much longer duration, 160 ms, compared to the frames in speech state (20 ms). Further, the frames in SID state are also smaller, approximately 400 bits, than the bits in speech state, which are approximately 600 bits. Any of these facts could be used to detect if the transmitter is in silent mode.

According to an embodiment, for detecting if the transmitter is in silent mode, a service called service aware buffer estimation may be used. This service is described in WO2011/025427. The service aware buffer estimation service is used by the scheduler to efficiently allocate resources to a VoIP user by estimating when a TALK/SID frame arrives into a buffer of the UE as well as how many bits the frame consists of. The Service Aware Buffer estimation service analyzes the arrival times and sizes of arriving packets for the logical channel that is configured for VoIP and predicts the arrival times as well as the packet sizes for future packets. Since the service predicts sizes of arriving packets, and the size of packets for speech differs from the size of packets for silence, the result from the service may according to an embodiment of the invention be used to detect whether the transmitter is in speech state or silent state.

Figure 2:
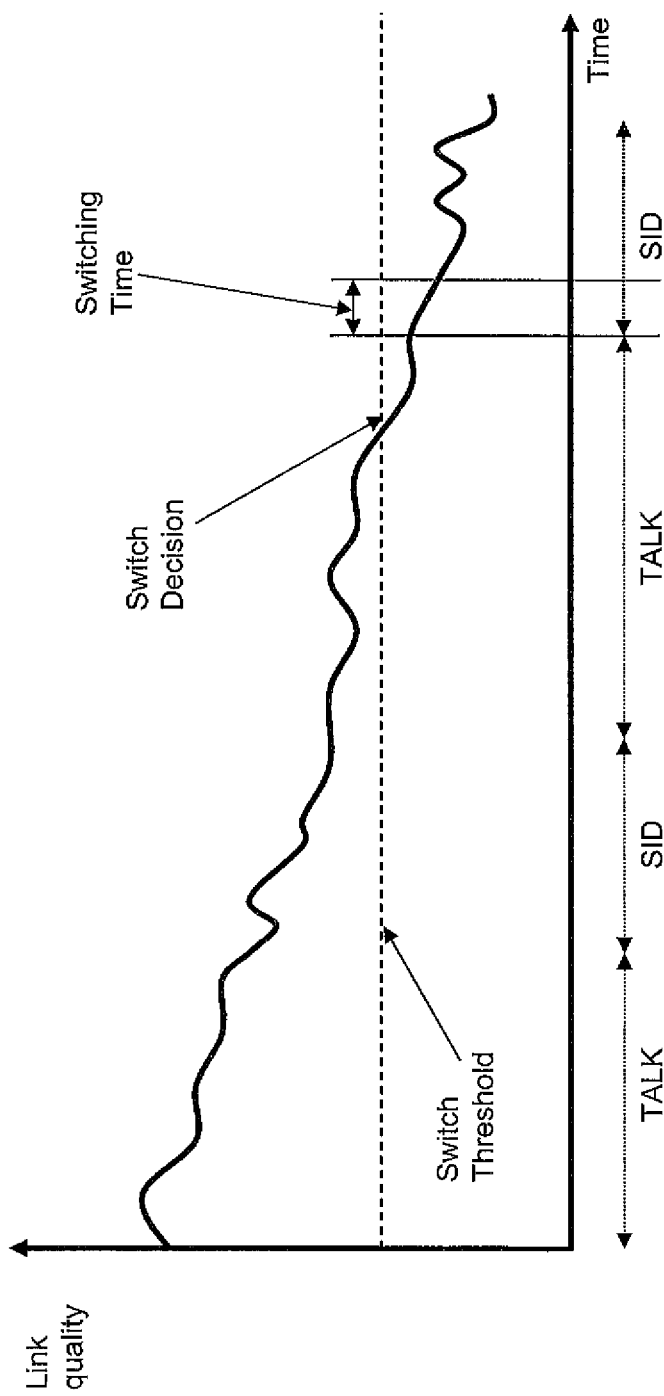
FIG. 2 is a diagram of transmission link quality as a function of time, according to an embodiment.

FIG. 2 is a diagram showing a typical switch from TTI bundling disabled mode to TTI bundling enabled mode according to an embodiment. As could be seen in the figure, the link quality is measured. When the link quality decreases below a switch threshold value, a switch decision is made. Although, the switch is not triggered until the transmitter is in silent mode, which is illustrated in the figure by the "SID" below the time axis. Also, the time that it takes for performing the switch (Switching time) is illustrated in the figure.

Figure 3:
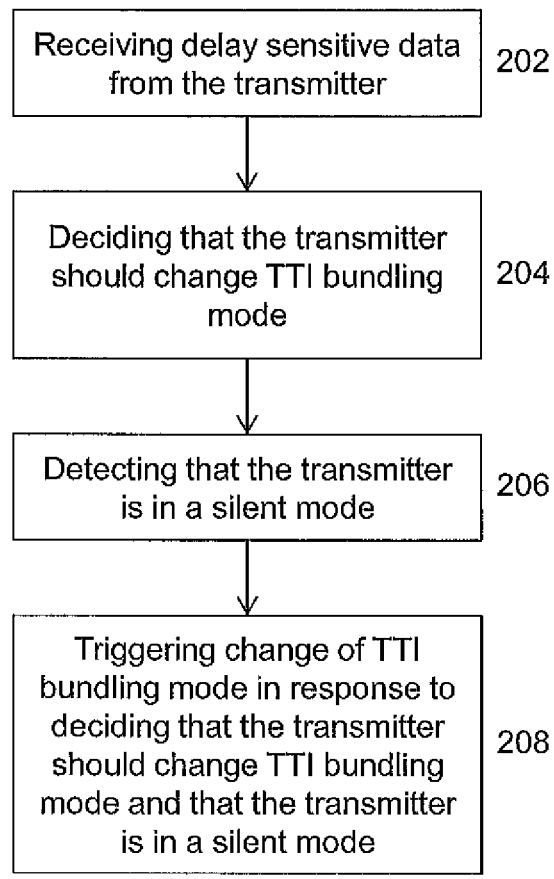
FIG. 3 is a flow chart illustrating a procedure in an eNodeB, according to a possible embodiment.

FIG. 3 shows a flow chart of a method for controlling transmission of delay-sensitive data from a transmitter over a transmission link in a packet data communication network, which transmitter is capable of changing between a TTI bundling enabled mode and a TTI bundling disabled mode. The method according to this embodiment comprises: receiving 202 delay-sensitive data from a transmitter over a transmission link; deciding 204 that the transmitter should change TTI bundling mode; detecting 206 that the transmitter is in silent mode, and triggering 208 change of TTI bundling mode in response to deciding 204 that the transmitter should change TTI bundling mode and detecting 206 that the transmitter is in silent mode.

According to an embodiment, it is detected 206 that the transmitter is in a silent mode by analyzing the data received from the transmitter.

According to another embodiment, it is detected 206 that the transmitter is in a silent mode by analyzing data packet size and/or time intervals between received data packets.

According to yet another embodiment, it is detected 206 that the transmitter is in a silent mode by detecting a Silence Insertion Descriptor, SID, frame or packet in the data received from the transmitter.

According to still another embodiment, deciding 204 that the transmitter should change TTI bundling mode is performed in response to detecting that the transmission link has changed quality.

According to an embodiment, it is detected 204 that the transmission link has changed quality by analyzing a quality value of the received delay-sensitive data or a quality value of the transmission link, and by detecting that the quality value crosses a threshold value. The threshold value may be a predetermined value, or it may be a value decided based on the total number of transmitters being in TTI bundling enabled mode in the cell.

According to an embodiment, it is detected 206 that the transmission link has changed quality by analyzing path loss of the link.

According to yet another embodiment, it is detected 206 that the transmission link has changed quality by detecting that the delay-sensitive data has changed state between a segmented state and a non-segmented state. By "a segmented state" is meant that a data frame or data packet has been divided into smaller units, called segments, which are transmitted separately.

According to another embodiment, triggering 208 change of TTI bundling mode is performed after first deciding 204 that the transmitter should change TTI bundling mode, and, simultaneously or later in time, detecting 206 that the transmitter is in a silent mode.

The transmitter may be arranged in a user equipment 110. Alternatively, the transmitter is arranged in a base station, e.g. an eNodeB. The method may be performed in a base station 120. The delay-sensitive data may be Voice over IP data.

Figure 4:
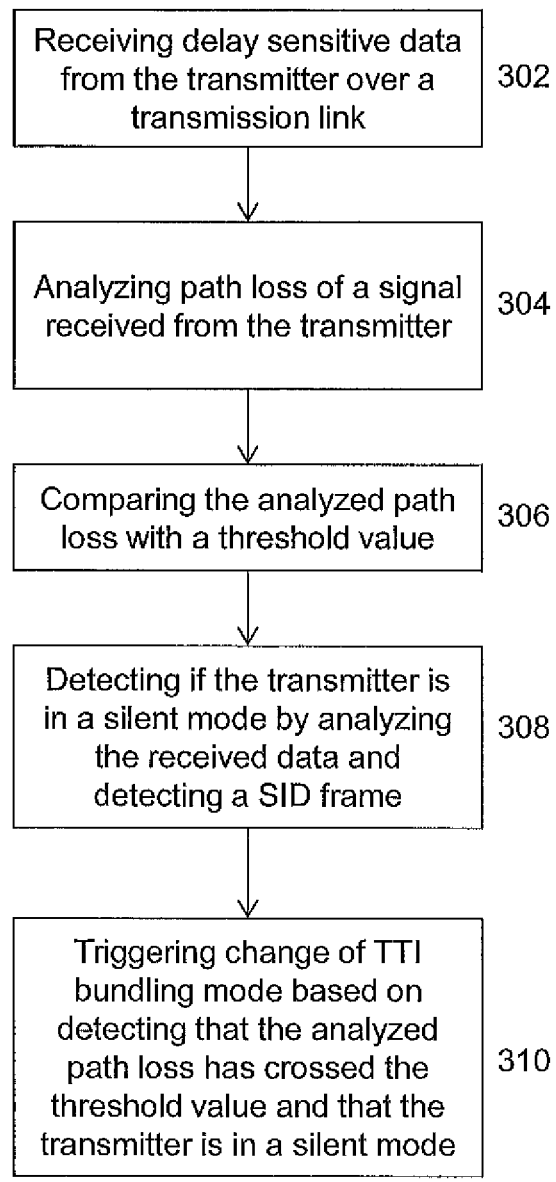
FIG. 4 is another flow chart illustrating a procedure in an eNodeB, according to a possible embodiment.

FIG. 4 is a flow chart of a method according to another embodiment. The method starts by receiving delay sensitive data 302 over a transmission link from the transmitter. Path loss of a signal received over the transmission link is analyzed 304 and compared 306 with a threshold value. It is also detected 308 if the transmitter is in a silent mode by analyzing the received data and detecting a SID packet or frame. Thereafter, a change of TTI bundling mode is triggered 310 based on the detection that the analyzed path loss has crossed the threshold value and that the transmitter is in a silent mode.

Figure 5:
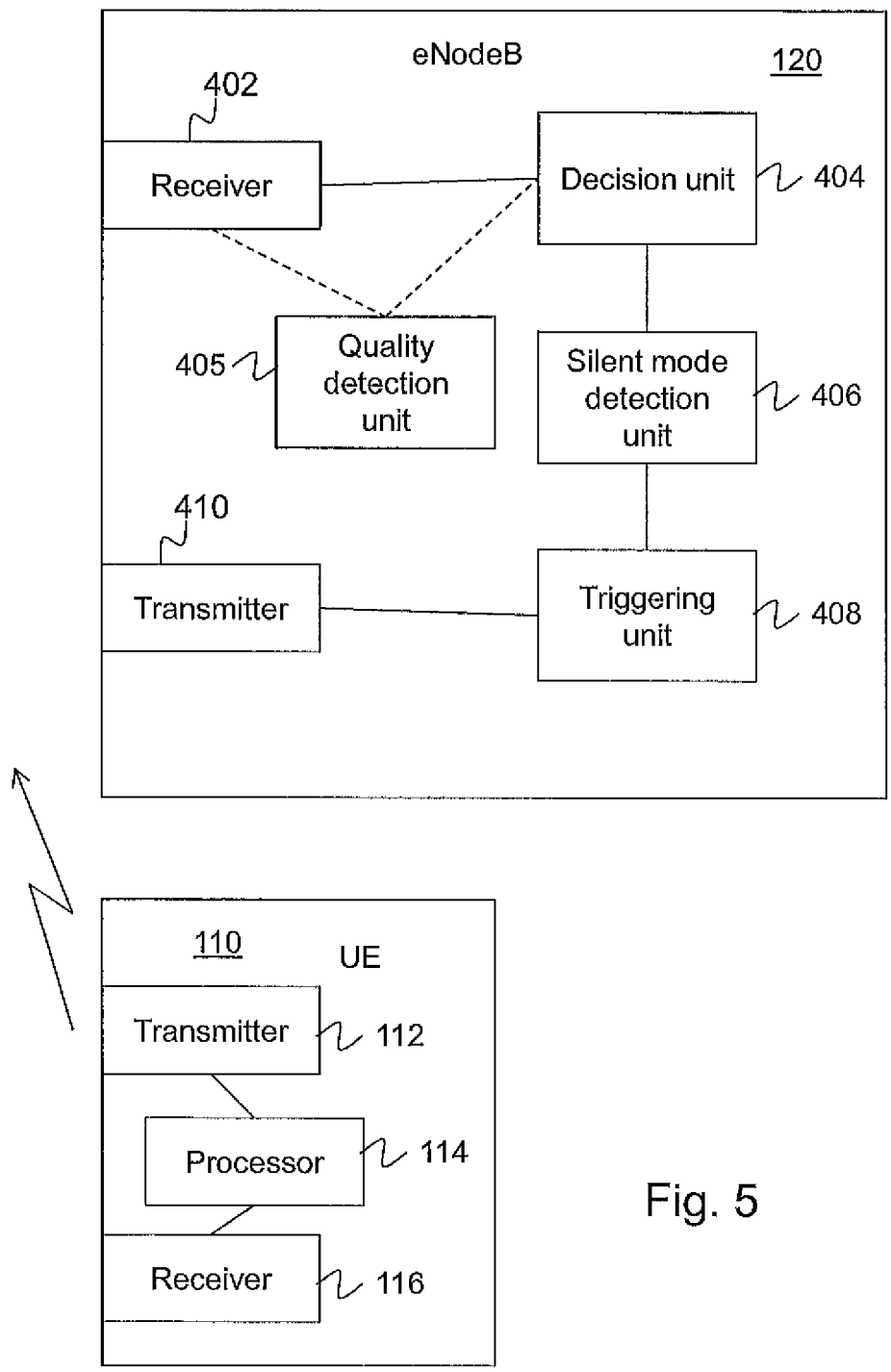
FIG. 5 is a schematic block diagram illustrating an arrangement according to some possible embodiments, communicating with a transmitter arranged in a user equipment.

FIG. 5 shows an arrangement in an eNodeB 120 according to an embodiment, and a UE 110 arranged to communicate with the eNodeB. The UE has a transmitter 112 for transmitting data such as delay-sensitive data to the eNodeB 120. The UE also has a receiver 116 for receiving data and instructions i.e. control signaling, from the eNodeB, and a processor 114 for processing data and instructions received by the receiver.

The arrangement in the eNodeB 120 has a receiver 402 for receiving data from the transmitter 112 of the user equipment 110 over a transmission link. The arrangement further has a transmitter 410 for sending instructions and data to the user equipment 110 for controlling transmission of delay-sensitive data from the transmitter 112 of the user equipment. Further, the arrangement has a decision unit 404 for deciding that the transmitter 112 should change TTI bundling mode; a silent mode detection unit 406 for detecting that the transmitter 112 is in a silent mode; and a triggering unit 408 for triggering change of TTI bundling mode in response to deciding that the transmitter should change TTI bundling mode and in response to detecting that the transmitter is in a silent mode. The signal triggered by the triggering unit is to be sent to the user equipment via the transmitter 410. The UE is arranged to respond to a received triggering signal by changing TTI bundling mode. Thereafter, subsequent data to be sent from the UE to the eNodeB is sent using the TTI bundling mode to which the UE has changed.

According to an embodiment, the silent mode detection unit 406 is arranged to detect that the transmitter 112 is in a silent mode by analyzing the data received from the transmitter. In addition, the silent mode detection unit 406 may be arranged to analyze data received from the transmitter 112 by analyzing data packet size and/or time intervals between received data packets.

According to another embodiment, the silent mode detection unit 406 is arranged to detect that the transmitter 112 is in a silent mode by detecting a Silence Insertion Descriptor, SID, frame or packet in the data received from the transmitter.

According to yet another embodiment, the arrangement further comprises a quality detection unit 405 for detecting that the transmission link has changed quality. The decision unit 404 is then further arranged to decide that the transmitter 112 should change TTI bundling mode in response to detecting that the transmission link has changed quality. The quality detection unit 405 may be arranged to send quality detection data to the decision unit on which the decision unit may act to make decisions regarding whether the transmitter 112 of the UE 110 should change TTI bundling mode.

According to yet another embodiment, the quality detection unit 405 is arranged for detecting that the transmission link has changed quality by analyzing a quality value of the delay-sensitive data received by the receiver 402, or a quality value of the transmission link. The quality detection unit may further be arranged to detect that the quality value crosses a threshold value. The threshold value may be predetermined.

According to another embodiment, the quality detection unit 405 is arranged for detecting that the transmission link has changed quality by analyzing path loss of the link.

According to another embodiment, the triggering unit 408 is arranged to trigger change of TTI bundling mode after first receiving an indication from the decision unit 404 that the transmitter should change TTI bundling mode, and, simultaneously or later in time, receiving an indication from the silent mode detection unit 406 that the transmitter is in a silent mode.

According to an embodiment, the arrangement of the invention is arranged for controlling transmission of data from the transmitter 112 arranged in the user equipment 110. Alternatively, the arrangement may be arranged for controlling transmissions from the transmitter 410 arranged in the eNodeB 120.

According to an alternative embodiment, after it has been decided that the transmitter should change TTI bundling mode, and there is no detection of the transmitter being in silent mode within a certain maximum time from when the decision was made, a switch may be triggered anyhow. In other words, a switch will be performed after a maximum time from the decision to change TTI bundling mode, if there is no silent mode detected. According to another embodiment, a switch is not performed if, at the time when a SID is detected the quality of the link has again changed such that a switch of TTI bundling mode should not be performed.

By at least some of the solutions presented above, one or many of the following advantageous may be achieved:

TTI bundling is enabled for user equipments actually needing the increased transmit power that results from TTI bundling. Cell-center user will therefore typically operate in TTI bundling disabled mode. Consequently, not more air interface resources than necessary will be used in a cell.

The cost for switching from TTI bundling enabled to TTI bundling disabled mode and vice versa is minimized by performing the switch when the transmitter is in silent mode, i.e. when the VoIP service activity is low, e.g. when a SID is detected. Hence, the time between packets is significantly longer giving more time to perform the switch without delay penalty. The time during which the user cannot be scheduled does not affect the speech packet delay of the VoIP service. This increases the quality of the VoIP service and the VoIP capacity of the cell.

Since the time between packets is larger when the transmitter is in silent mode than when the transmitter is in speech mode, to perform the switch when the transmitter is in silent mode will result in fewer packets in the transmitter buffer when scheduling resumes compared to if the switch was performed when the transmitter was in speech mode.

While the solution has been described with reference to specific exemplary embodiments, the description is generally only intended to illustrate the inventive concept and should not be taken as limiting the scope of the solution.

The invention claimed is:

1. A method for controlling transmission of delay-sensitive data from a transmitter over a transmission link in a packet data communication network, where the transmitter is capable of changing between a transmission time internal (TTI) bundling enabled mode and a TTI bundling disabled mode, the method comprising:
receiving data from the transmitter over the transmission link;
analyzing a quality value of the data transmitted over the transmission link;
deciding that the transmitter should change from the TTI bundling disabled mode to the TTI bundling enabled mode based on the quality value;

detecting whether the transmitter is in a silent mode, wherein the silent mode is a mode in which a service at the transmitter that generates delay-sensitive data is inactive; and triggering change to the TTI bundling enabled mode in response to the deciding that the transmitter should change from the TTI bundling disabled mode to the TTI bundling enabled mode, but only in response to detecting that the transmitter is in the silent mode, and when detecting that the transmitter is not in the silent mode, waiting on triggering change to the TTI bundling enabled mode until the transmitter is in the silent mode.

2. The method according to claim 1, wherein it is detected that the transmitter is in the silent mode by analyzing the data received from the transmitter.

3. The method according to claim 2, wherein the data received from the transmitter is analyzed by analyzing at least one of data packet size and time intervals between received data packets.

4. The method according to claim 1, wherein it is detected that the transmitter is in the silent mode by detecting a Silence Insertion Descriptor (SID) frame or packet in the data received from the transmitter.

5. The method according to claim 1, wherein the analyzing the quality value of the data transmitted over the transmission link analyzes a signal to noise ratio of the data transmitted over the transmission link.

6. The method according to claim 5, wherein the deciding that the transmitter should change to the TTI bundling enabled mode is based on the signal to noise ratio crossing a threshold value.

7. The method according to claim 1, wherein the quality value relates to path loss of the transmission link.

8. The method according to claim 1, wherein triggering change to the TTI bundling enable mode is performed after first deciding that the transmitter should change to the TTI bundling enable mode, and, simultaneously or later in time, detecting that the transmitter is in the silent mode.

9. The method according to claim 1, wherein the transmitter is arranged in a user equipment.

10. The method according to claim 1, wherein the method is performed in a base station.

11. The method according to claim 1, wherein the delay-sensitive data is Voice over IP data.

12. An apparatus for controlling transmission of delay-sensitive data from a transmitter over a transmission link in a packet data communication network, which transmitter is capable of changing between a transmission time internal (TTI) bundling enabled mode and a TTI bundling disabled mode, the apparatus comprising:

a receiver operative to receive data from the transmitter over the transmission link;

a quality detection unit to analyze a quality value of the data transmitted over the transmission link:

a decision unit operative to decide that the transmitter should change from the TTI bundling disabled mode to the TTI bundling enabled mode based on the quality value;

a silent mode detection unit operative to detect whether the transmitter is in a silent mode, wherein the silent mode is a mode in which a service at the transmitter that generates delay-sensitive data is inactive; and a triggering unit operative to trigger change to the TTI bundling enabled mode in response from the decision unit that the transmitter should change from the TTI bundling disabled mode to the TTI bundling enabled mode, but only in response to a detection that the transmitter is in the silent mode, and when the transmitter is not in the silent mode, wait to trigger change to the TTI bundling enabled mode until the transmitter is in the silent mode.

13. The apparatus according to claim 12, wherein the silent mode detection unit is operative to detect that the transmitter is in the silent mode by analyzing the data received from the transmitter.

14. The apparatus according to claim 13, wherein the silent mode detection unit is operative to analyze data received from the transmitter by analyzing at least one of data packet size and time intervals between received data packets.

15. The apparatus according to claim 12, wherein the silent mode detection unit is operative to detect that the transmitter is in the silent mode by detecting a Silence Insertion Descriptor (SID) frame or packet in the data received from the transmitter.

16. The apparatus according to claim 12, wherein the decision unit decides to change to the TTI bundling enable mode is based on the quality value crossing a threshold value.

17. The apparatus according to claim 12, wherein the quality value relates to path loss of the transmission link.

18. The apparatus according to claim 12, wherein the triggering unit is operative to trigger change to the TTI bundling enabled mode after first reception of an indication from the decision unit that the transmitter should change to the TTI bundling enabled mode, and, simultaneously or later in time, receiving an indication from the silent mode detection unit that the transmitter is in the silent mode.

19. The apparatus according to claim 12, wherein the apparatus is arranged in a base station.

20. The apparatus according to claim 12, wherein the apparatus is operative to control transmission of data from a transmitter arranged in a user equipment.

* * * * *